(12) United States Patent
Sih et al.

(10) Patent No.: US 7,116,957 B2
(45) Date of Patent: Oct. 3, 2006

(54) VELOCITY RESPONSIVE FILTERING FOR PILOT SIGNAL RECEPTION

(75) Inventors: Gilbert Christopher Sih, San Diego, CA (US); Andrew Kan, Sunnyvale, CA (US); Stein A. Lundby, Solana Beach, CA (US); Shimman Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 09/986,222

(22) Filed: Oct. 22, 2001

(65) Prior Publication Data

US 2005/0020219 A1    Jan. 27, 2005

(51) Int. Cl.
*H04B 1/06* (2006.01)
(52) U.S. Cl. .................... 455/266; 455/307; 455/339
(58) Field of Classification Search ............. 455/266, 455/307, 339, 130, 136, 192.1; 370/342, 370/441, 341; 375/346, 349, 350; 702/142, 702/149, 249
See application file for complete search history.

(56) References Cited

U.S. PATENT DOCUMENTS 5,329,547 A * 7/1994 Ling ......................... 370/342
6,373,882 B1 * 4/2002 Atarius et al. ............... 375/349
6,658,045 B1 * 12/2003 Jin ............................. 375/141

OTHER PUBLICATIONS

Blostein, S., et al. (1995) A change-detection approach to monitoring fading channel bandwidth. Information Theory p. 155.
Li, H., et al. (1990) An adaptive filtering technique for pilot aided transmission systems. IEEE pp. 507-512.
Oh, H., et al. (2000) An Adaptive channel estimation scheme for DS-CDMA systems. VTC pp. 2839-2843.
Sakamoto, M., et al. (2000) Adaptive channel estimation with velocity estimator for W-CDMA receiver. VTC pp. 2024-2028.

* cited by examiner

*Primary Examiner*—Quochien B. Vuong
(74) *Attorney, Agent, or Firm*—Phillip R. Wadsworth; Charles D. Brown; Howard H. Seo

(57) ABSTRACT

The velocity of a wireless communications device (106) is estimated. In response to this estimate, a filter bandwidth, such as a pilot filter (310) bandwidth, is adjusted so that the introduction of noise and distortion to a signal received by the device is mitigated. The filter bandwidth is adjusted by increasing it as the estimated velocity increases; and decreasing it as the estimated velocity decreases. Such adjustments may be accomplished through providing a number of predetermined bandwidths that each correspond to a particular velocity range, and setting the filter bandwidth to the predetermined bandwidth that corresponds to the estimated velocity.

13 Claims, 13 Drawing Sheets

VELOCITY RESPONSIVE FILTERING FOR PILOT SIGNAL RECEPTION

BACKGROUND OF THE INVENTION

1. Field of the Invention

The present invention relates generally to wireless communications devices. More specifically, the present invention relates to adaptive filtering techniques for use in mobile communications environments.

2. Related Art

Mobile communications devices, such as wireless phones, are often employed in vehicles or other mobile platforms that travel at relatively high velocities. For example, mobile communications devices are often used in automobiles, trains, and airplanes that travel at speeds as fast as several hundred kilometers per hour.

In wireless communications environments, Doppler frequency shifts occur in signals transmitted between a transmitter and a receiver when the transmitter and the receiver have a relative velocity with respect to each other. This relative velocity causes signals, from the perspective of the receiver, to have frequencies that are shifted from the frequencies transmitted by the transmitter. When the relative velocity is an approaching velocity, these frequency shifts are upward. However, when the relative velocity is a departing velocity, these frequency shifts are downward.

Many components in wireless communications devices, such as filters, are configured to receive signals within a particular frequency range. Unfortunately, Doppler frequency shifts can place such signals outside of these configured frequency ranges. This condition can lead to degraded performance.

For example, in wireless communications systems that operate according to code division multiple access (CDMA) standards, such as IS-95A and IS-95B (referred to herein as IS-95 systems), signals known as pilot signals are transmitted from base stations to mobile devices. These pilot signals provide timing and phase references that enable these mobile devices to receive and demodulate traffic signals carrying information such as data and voice that are also transmitted by the base station.

Since these pilot signals are used as timing and phase references, their signal-to-noise ratio (SNR) directly affects a device's ability to receive and demodulate traffic signals.

Wireless communications devices typically filter pilot signals with a pilot filter having a fixed bandwidth. Because mobile communications environments often involve Doppler frequency shifts, portions of a received pilot signal's spectrum can fall outside of the pilot filter's fixed bandwidth. This causes distortions that reduce the pilot signal's SNR.

On the other hand, if the pilot filter's fixed bandwidth is sufficiently large to accommodate such Doppler frequency shifts, out of band noise can be introduced to the pilot signal reception processor. Unfortunately, this introduction of noise also reduces the pilot signal's SNR.

Accordingly, what is needed is a technique that enables pilot filtering to be performed in a manner that accommodates Doppler frequency shifts, while not causing a SNR reduction in pilot signals.

SUMMARY OF THE INVENTION

The present invention is directed to a method and system for improving the reception of a signal in a wireless communications device. The method and system estimate the velocity of the device; and adjust a filter bandwidth, such as a pilot filter bandwidth, in the device in response to the estimated velocity, so that the introduction of noise and distortion to the signal is mitigated.

The filter bandwidth is adjusted by increasing it as the estimated velocity increases; and decreasing it as the estimated velocity decreases. Such adjustments may be accomplished through providing a number of predetermined bandwidths that each correspond to a particular velocity range, and setting the filter bandwidth to the predetermined bandwidth that corresponds to the estimated velocity.

The device's velocity is estimated by measuring a level crossing rate of a multipath signal. Alternatively, this velocity may be estimated through the periodic monitoring of the device's location through services such as the global positioning system (GPS).

The present invention advantageously tailors bandwidths to provide for the effective filtering of signals that have variable bandwidths due to Doppler frequency shifts.

BRIEF DESCRIPTION OF THE DRAWINGS/FIGURES

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

I. Communications Environment

Figure 1:
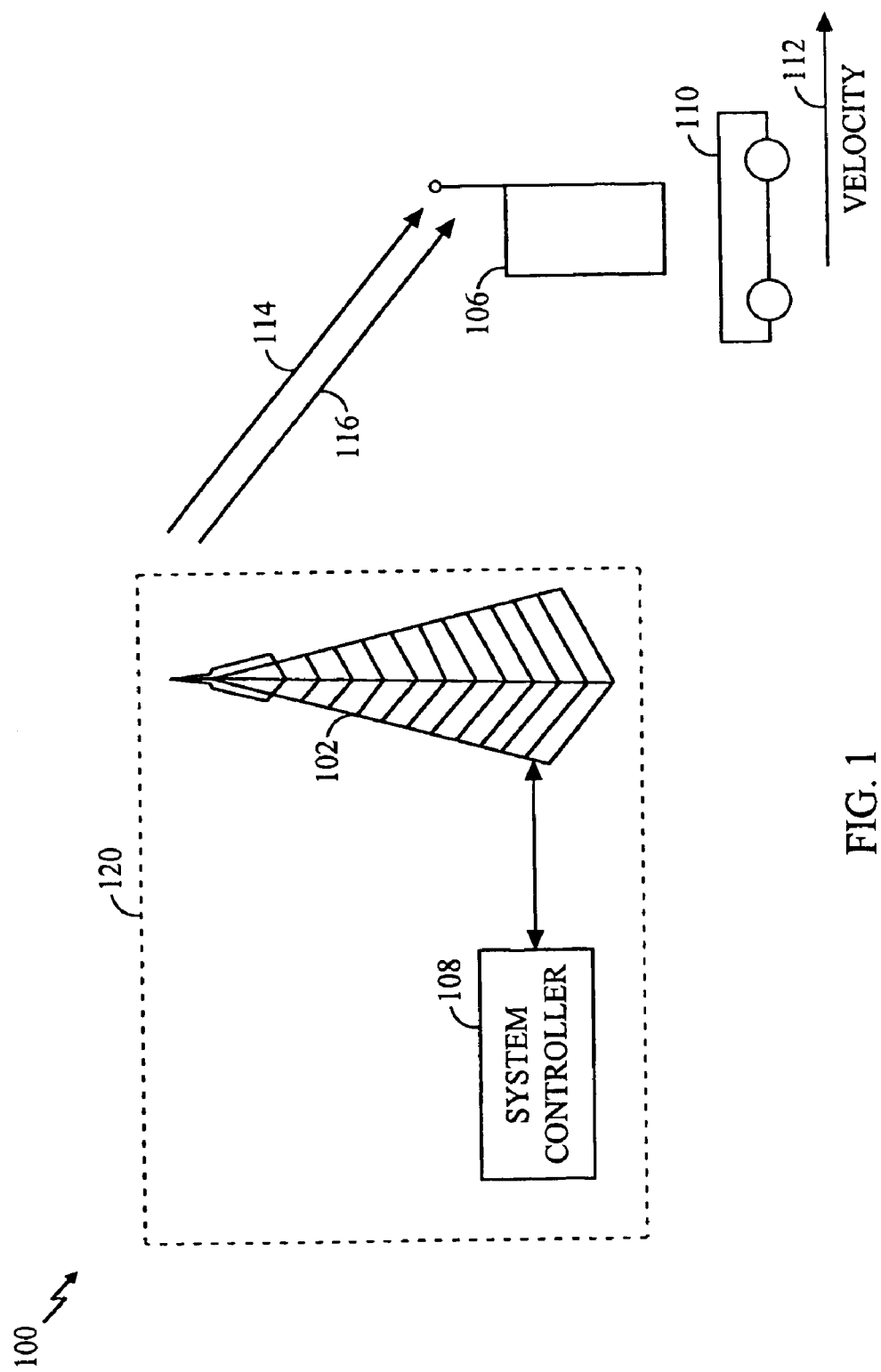
FIG. 1 is a block diagram of an exemplary mobile communications environment.

Before describing the invention in detail, it is helpful to describe an example environment in which the invention may be implemented. The present invention is particularly useful in mobile communications environments. FIG. 1 illustrates such an environment.

FIG. 1 is a block diagram of an exemplary mobile communications environment 100. Communications environment 100 includes a base station 102, a system controller 108, a wireless communications device (WCD) 106, and a mobile platform 110.

Base station 102 is coupled to system controller 108. Together, base station 102 and system controller 108 are part of a wireless communications system (WCS) 120 that exchanges information with WCD 106. This information exchange provides services, such as cellular telephony, and personal communications system (PCS) applications.

This exchange of information between WCS 120 and WCD 106 occurs across various communications channels. Of these various communications channels, a pilot channel 114 and a traffic channel 116 are shown in FIG. 1. These channels enable the transfer of information from base station 102 to WCD 106.

Traffic channel 116 carries traffic signals conveying information, such as digitally encoded voice and data. Pilot channel 114 carries pilot signals to WCD 106 from base station 102. Pilot signals enable WCD 106 to determine the timing of traffic signals transmitted across traffic channel 116. This timing determination enables WCD 106 to receive and process information contained in the traffic signals.

These traffic signals and pilot signals are CDMA signals. CDMA signals are generated from symbol sequences through channelizing and spreading processes. Spreading involves multiplying a symbol sequence with a spreading sequence, such as a pseudonoise (PN) sequence. Channelizing involves the use of orthogonal channelizing codes, such as Walsh codes. Such codes enable multiple transmissions to simultaneously share portions of the radio frequency (RF) spectrum without interference.

An exemplary CDMA signal generation process involves channelizing a symbol sequence, such as a stream of binary bits, with a Walsh code, and then spreading the "channelized" sequence with a quadrature pair of PN sequences. This spreading function produces an in-phase (I) CDMA sequence, and a quadrature (Q) CDMA sequence. These in-phase and quadrature sequences (not shown) are then modulated through quadrature phase shift keying (QPSK) and transmitted to WCD 106 as an RF signal.

As described above, pilot signals transmitted across pilot channel 114 provide timing references for traffic signals transmitted across traffic channel 116. These timing references include a phase reference that enables WCD 106 to become synchronized with the spreading and channelizing functions performed by base station 102. In addition, this phase reference allows WCD 106 to coherently demodulate traffic signals transmitted by base station 102.

WCD 106 is a communications device, such as a portable telephone. As illustrated in FIG. 1, WCD 106 is attached to mobile platform 110. Mobile platform 110 has a motion that is defined by velocity vector 112. This motion causes Doppler frequency shifts in RF signals that WCD 106 receives from base station 102. Mobile platform 110 may be an automobile, a train, an airplane, or any other platform capable of transporting WCD 106 at a relatively high velocity sufficient to impart a noticeable Doppler shift to the RF signals.

II. Communications Device

Figure 2:
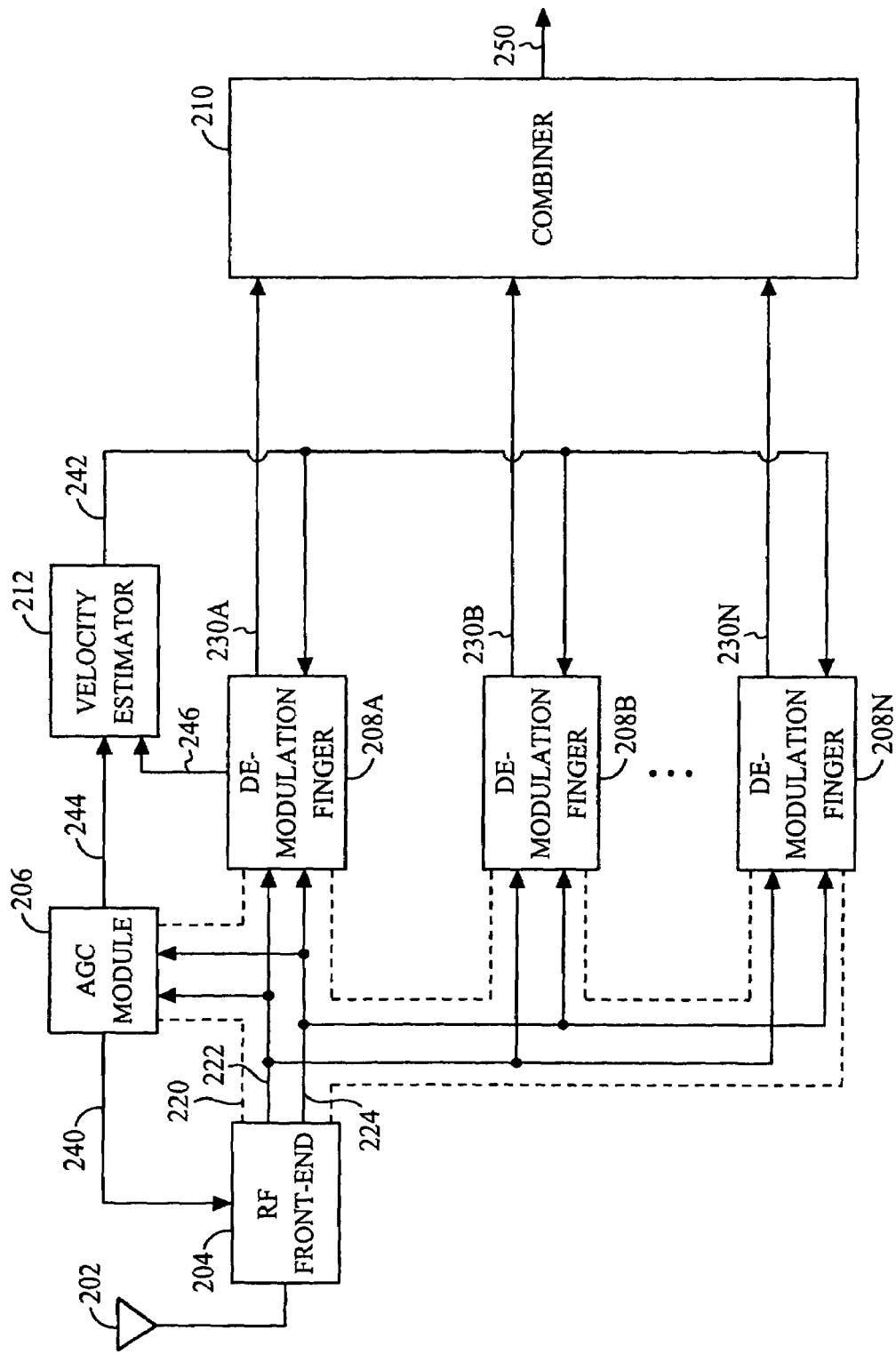
FIG. 2 is an illustration of a receiver portion of a wireless communications device.

FIG. 2 is an illustration of a receiver portion 200 of WCD 106. Receiver portion 200 includes an antenna segment 202, an RF front end 204, an automatic gain control (AGC) module 206, a plurality of demodulation fingers 208a through 208n, and a combiner 210.

Antenna segment 202 receives radio frequency (RF) transmissions from one or more base stations, such as base station 102. Antenna segment 202 forwards these transmissions as electrical signals to RF front end 204.

The RF transmissions received by antenna segment 202 include pilot signals and traffic signals transmitted across pilot channel 114 and traffic channel 116, respectively. Each of these received signals may be a composite signal that includes a plurality of multipath components. Multipath components are individual RF wavefronts that are emitted by the same RF transmitter, but arrive at a receiving antenna along different paths. These different paths are the result of wavefront reflections caused by physical terrain and structure surrounding WCD 106, as well as other physical occurrences in the RF transmission environment. The multipath components of a particular RF signal are substantially identical, except for a distinct time shift and power level.

For the communications environment shown in FIG. 1, pilot signals and traffic signals sent across pilot channel 114 and traffic channel 116 may each have a plurality of multipath components. These multipath components will be grouped in signal pairings that include a pilot signal multipath component and a traffic signal multipath component. These paired multipath components will have substantially identical propagation delays and power attributes. As will be described below, WCD 106 will identify and process these signal pairings in functional components referred to herein as demodulation fingers. These components are described below in greater detail with reference to FIGS. 3–6.

In addition to receiving RF signals from one or more base stations, antenna segment 202 may receive electrical signals for wireless transmission from a transmit power amplifier (not shown) within WCD 106. Additionally, to enable the simultaneous transmission and reception of RF signals through a single antenna within antenna segment 202, antenna segment 202 may also include a diplexer (not shown).

RF front end 204 receives electrical signals from antenna segment 202 within an RF frequency band. Examples of RF frequency bands include a cellular frequency band centered at 800 MHz, and a personal communications services (PCS) communications band centered at 1.9 GHz. Upon reception, RF front end 204 down converts these electrical signals from the RF frequency band to baseband. In addition, RF front end 204 may filter the electrical signals received from antenna segment 202 in accordance with a predetermined bandwidth.

RF front end 204 also includes amplification components (not shown) that increase the power of RF signals, such as pilot and traffic signals, received by antenna segment 202. Exemplary amplification components include a low noise amplifier (LNA) to initially amplify signals upon reception by antenna segment 202, and a variable gain amplifier (VGA) to amplify these signals after they are mixed down to an intermediate frequency (IF) during the down conversion process described above. One or more of these amplification components have variable gains that are controlled by AGC module 206.

As a result of the functions described above, RF front end 204 produces a baseband signal set 220. Baseband signal set 220 includes an in-phase (I) signal component 222 and a quadrature (Q) signal component 224. These components are digital symbol sequences.

AGC module 206 adjusts the gain of amplification components within RF front end 204. These adjustments maintain signal set 220 at a substantially constant power level. AGC module 206 performs these adjustments in response to feedback received from signal set 220. This feedback is used to measure the energy of signal set 220.

These adjustments involve sending a gain control signal 240 to RF front end 204. Gain control signal 240 may include a plurality of component signals, where each of these component signals corresponds to a particular amplification component within RF front end 204. These control signals may be analog or digital, and convey a gain setting for the corresponding amplification component.

Velocity estimator 212 receives a voltage estimate 244 from AGC module 206 and a baseband pilot sequence set 246 from within one of demodulation fingers 208. Voltage estimate 244 is processed by velocity estimator 212 to provide a velocity estimate signal 242 that is sent to each of demodulation fingers 208a–n. Velocity estimate signal 242 indicates the magnitude of velocity vector 112 and controls the bandwidth of a pilot filter within each demodulation finger 208. These pilot filters are described below with reference to FIGS. 3–6. Various implementations of velocity estimator 212 are described below with reference to FIGS. 12 and 13.

The description now returns to baseband signal set 220. Like the incoming RF signals received by antenna segment 202, baseband signal set 220 includes a plurality of component signals. These component signals may include a plurality of multipath transmission components relating to one or more pilot channels 114 and traffic channels 116.

RF front end 204 passes baseband signal set 220 into each of demodulation fingers 208a–n. In turn, each demodulation finger 208 identifies and tracks a distinct signal pairing from baseband signal set 220. As described above, these signal pairings each include a pilot signal component and a time-aligned traffic signal component. Thus, demodulation fingers 208a–n may each individually track and receive a pilot signal component and a traffic signal component sharing the same multipath delay.

Demodulation fingers 208 track multipath components by integrating received pilot signals over a period of time to separate the power in one multipath component from the total received power. This period of time is based on RF fading characteristics.

Each of demodulation fingers 208 processes its respective signal pairing and outputs a corresponding symbol sequence 230. These symbol sequences are sent to combiner 210. Symbol sequences 230 match corresponding symbol sequences that were spread, encoded, modulated, and transmitted across traffic channel 116 by base station 102.

In addition to receiving baseband signal set 220, each demodulation finger 208 receives velocity estimate signal 242 from velocity estimator 212. Velocity estimate signal 242 enables demodulation fingers 208 to adjust their performance so that they may adapt to Doppler frequency shifts associated with velocity vector 112.

Upon output from each of fingers 208, symbol sequences 230 are summed by combiner 210, thereby producing a single symbol sequence 250. Before summation by combiner 210, each individual sequence 230 may be weighted and/or processed in manners to optimize the quality of combined symbol sequence 250, as would be apparent to persons skilled in the relevant arts.

Figure 3:
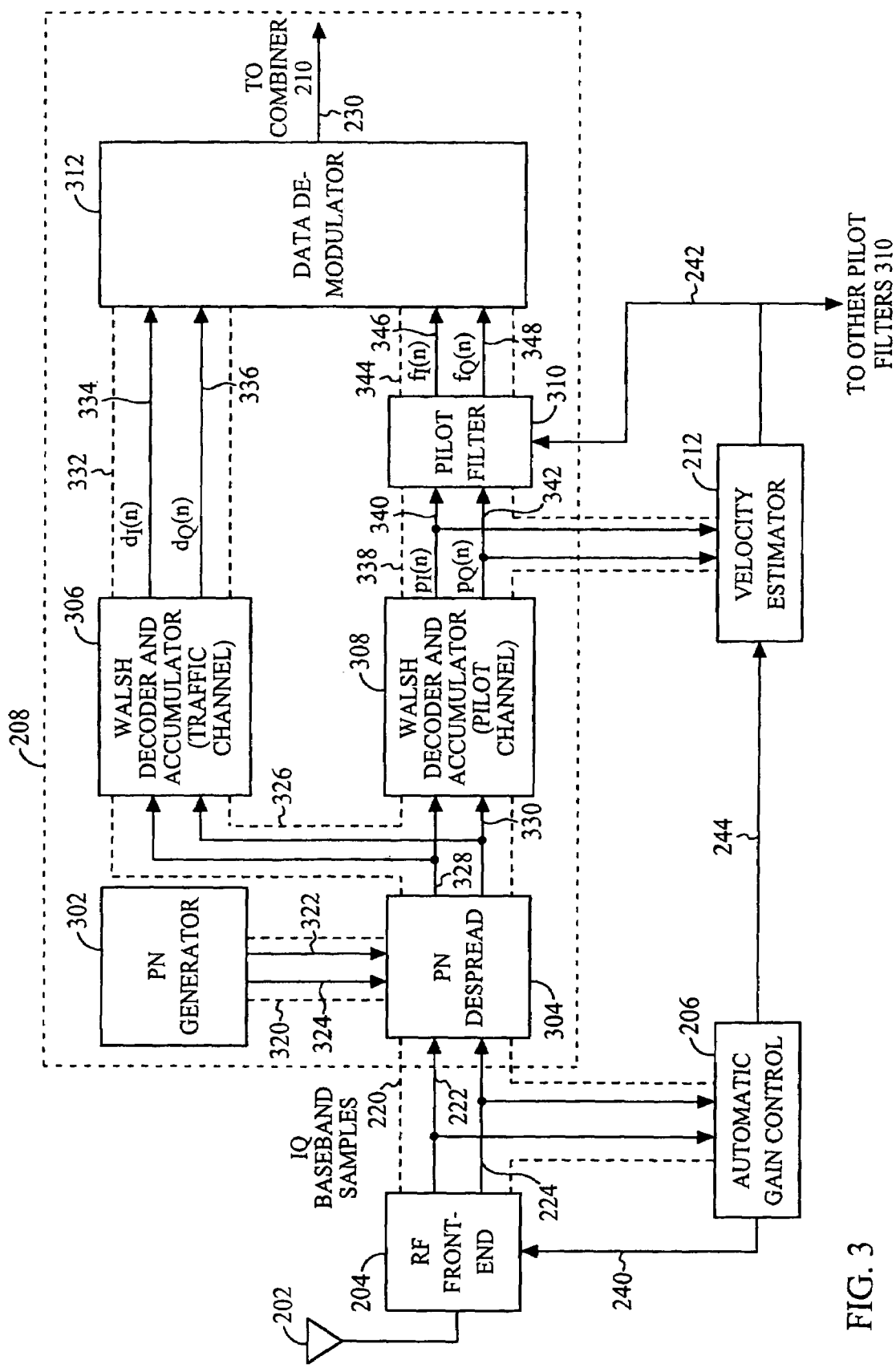
FIG. 3 is a block diagram illustrating an implementation of a demodulation finger.

FIG. 3 is a block diagram illustrating an implementation of finger 208. This implementation employs velocity-aided filtering techniques. As shown in FIG. 3, finger 208 includes a PN sequence generator 302, a PN despreader 304, a traffic channel decoder 306, a velocity responsive pilot channel decoder 308, a pilot filter 310 and a data demodulator 312.

PN sequence generator 302 generates a PN sequence set 320 that is sent to PN despreader 304. PN sequence set 320 includes an in-phase (I) PN sequence 322, which is aligned with I signal component 222, and a quadrature (Q) PN sequence 324, which is aligned with Q signal component 224.

PN despreader 304 receives baseband signal set 220 and processes it with PN sequence set 320 to produce despread signal set 326. Despread signal set 326 includes an in-phase (I) despread signal 328 and a quadrature (Q) despread signal 330. PN despreader 304 sends despread signal set 326 to decoders 306 and 308.

Decoder 306 decodes a traffic signal contained in despread signal set 326. This decoding process is known as decovering. Decovering a traffic signal involves the use of an orthogonal channelizing code, such as a Walsh code that was used by base station 102 to encode the traffic signal. Decoder 306 determines an appropriate channelizing code through an accumulation process. Accumulation involves correlating despread signal set 326 with one or more channelizing codes. Decoder 306 produces a baseband traffic sequence set 332. Traffic sequence set 332 includes an in-phase traffic sequence 334 and a quadrature pilot sequence 336.

Decoder 308 decodes a pilot signal contained in despread signal set 326 through the decovering and accumulation techniques described above with reference to decoder 306. This decoding produces a baseband pilot sequence set 338. Pilot sequence set 338 includes an in-phase pilot sequence 340 and a quadrature pilot sequence 342.

Decoders 306 and 308 perform decoding operations that involve the use of orthogonal channelizing codes, such as Walsh codes. The channelizing codes employed by Decoders 306 and 308 correspond to channelizing codes employed by encoding functionality within base station 102.

Pilot signals are used as a phase reference for the demodulation of traffic signals. The ability of WCD 106 to demodulate traffic signals is directly affected by the signal-to-noise ratio (SNR) of received pilot signals. Pilot filter 310 filters baseband sequence set 338 to eliminate noise from pilot sequence set 338, thereby increasing its SNR.

This filtering process produces a filtered pilot sequence set 344, which is sent to data demodulator 312. Filtered pilot sequence set 344 includes an in-phase (I) filtered pilot sequence 346 and a quadrature (Q) filtered pilot sequence 348. Pilot filter 310 is a low pass filter having a bandwidth that changes with velocity vector 112. An implementation of pilot filter 310 is described in greater detail with reference to FIG. 4.

Data demodulator 312 receives sequence sets 332 and 344. Data demodulator 312 retrieves a phase reference from filtered pilot sequence set 344. This phase reference enables data demodulator 312 to coherently demodulate baseband traffic sequence set 332 into symbol sequence 230. Output signal 230 is sent to combiner 210.

III. Velocity Responsive Filtering

Before describing pilot filter 310 in greater detail, a brief description of Doppler frequency shifts is provided. Velocity vector 112, as well as the positions of base station 102 and WCD 106, define a relative velocity between WCD 106 and base station 102. This relative velocity is the rate of change with respect to time of the distance between WCD 106 and base station 102. By convention, relative velocity is positive when WCD 106 and base station 102 are approaching (i.e., when the distance is decreasing), and negative when WCD 106 and base station 102 are departing (i.e., when the distance is increasing). This relative velocity determines a Doppler frequency shift in base station 102 originated RF signals that are received by WCD 106.

For base station 102 transmissions received by WCD 106, Equation (1) provides Doppler frequency shift magnitudes as a function of relative velocity.

$$f_d = \frac{vf}{c} \quad (1)$$

In Equation (1), $f_d$ is the Doppler frequency shift magnitude for received signals, v is the relative velocity in meters per second, f is the frequency of transmission in Hertz, and c is the speed of light in meters per second.

Table 1 provides a list of Doppler frequency shifts for an exemplary set of velocities. At each of the listed velocities, corresponding shifts for a cellular band transmission at 800 MHz and a PCS band transmission at 1.9 GHz are furnished.

TABLE 1

|  | Cellular Band (800) MHZ | PCS Band (1.9 GHZ) |
| --- | --- | --- |
| 5 km/hr | 3.70 Hz | 8.80 Hz |
| 30 km | 22.22 Hz | 52.77 Hz |
| 100 km/hr | 74.08 Hz | 175.91 Hz |
| 300 km/hr | 222.24 Hz | 527.72 Hz |

When base station 102 and WCD 106 have a relative approaching velocity, $f_d$ is positive. This positive magnitude yields an upward frequency shift for RF signals received by WCD 106. However, when base station 102 and WCD 106 have a relative departing velocity, $f_d$ is negative. This results in a downward frequency shift for RF signals received by WCD 106.

Conventional pilot filters have a fixed bandwidth. These fixed bandwidth filters can cause degraded WCD 106 performance in two situations. The first situation occurs when WCD 106 and base station 102 have a relative velocity that, based on the fixed pilot filter bandwidth, is greater than an upper velocity threshold $V_u$. Such relative approaching velocities cause upward frequency shifts in the RF signals received by WCD 106 from base station 102.

Upward frequency shifts of RF signals increase the bandwidth of corresponding down converted signals. In the context of the finger 208 implementation described with reference to FIG. 3, an upward Doppler frequency shift of RF signals received through antenna segment 202 will increase the bandwidth of sequences within baseband pilot sequence set 338 (i.e., sequences 340 and 342). If such bandwidth increases exceed the fixed bandwidth of a conventional pilot filter, then sequences within filtered pilot sequence set 344 (i.e., sequences 346 and 348) will be distorted. These distortions result in WCD 106 losing its ability to fully track pilot signals, which ultimately causes degraded traffic signal reception.

The second situation that can cause degraded WCD 106 performance occurs when WCD 106 and base station 102 have a relative velocity that, based on the fixed pilot filter bandwidth, is less than a lower velocity threshold $V_L$. When the relative velocity is lower than this threshold, the bandwidth of sequences within baseband pilot sequence set 338 (i.e., sequences 340 and 342) are well within the fixed bandwidth of a conventional pilot filter. In contrast to distorting pilot sequences, this situation causes extraneous noise (also referred to as out-of-band noise) to be included in the sequences within filtered pilot sequence set 344 (i.e., sequences 346 and 348). This extraneous noise results in an unacceptable SNR.

To prevent the distortions and out-of-band noise that occur in these situations, pilot filter 310 has an adjustable bandwidth. This bandwidth is dynamically adjusted based on the magnitude of velocity vector 112 SNR. As expressed in Equation (1), this magnitude indicates the maximum possible Doppler frequency shift that WCD 106 will encounter in the reception of RF signals from base station 102.

As the velocity of WCD 106 increases, the bandwidth of pilot filter 310 is also increased. This enables demodulation finger 208 to track it's corresponding pilot signal component. Similarly, as WCD 106 slows down, the bandwidth of pilot filter 310 is automatically decreased to the minimum bandwidth necessary for effective pilot signal tracking.

As described herein, pilot filter 310 filters baseband sequence set 338 to eliminate noise from pilot sequence set 338. To perform this filtering, pilot filter 310 includes a filter path (not shown) for each sequence within baseband sequence set 338. Two examples of filter path implementations are described below with reference to FIGS. 4–6.

Figure 4:
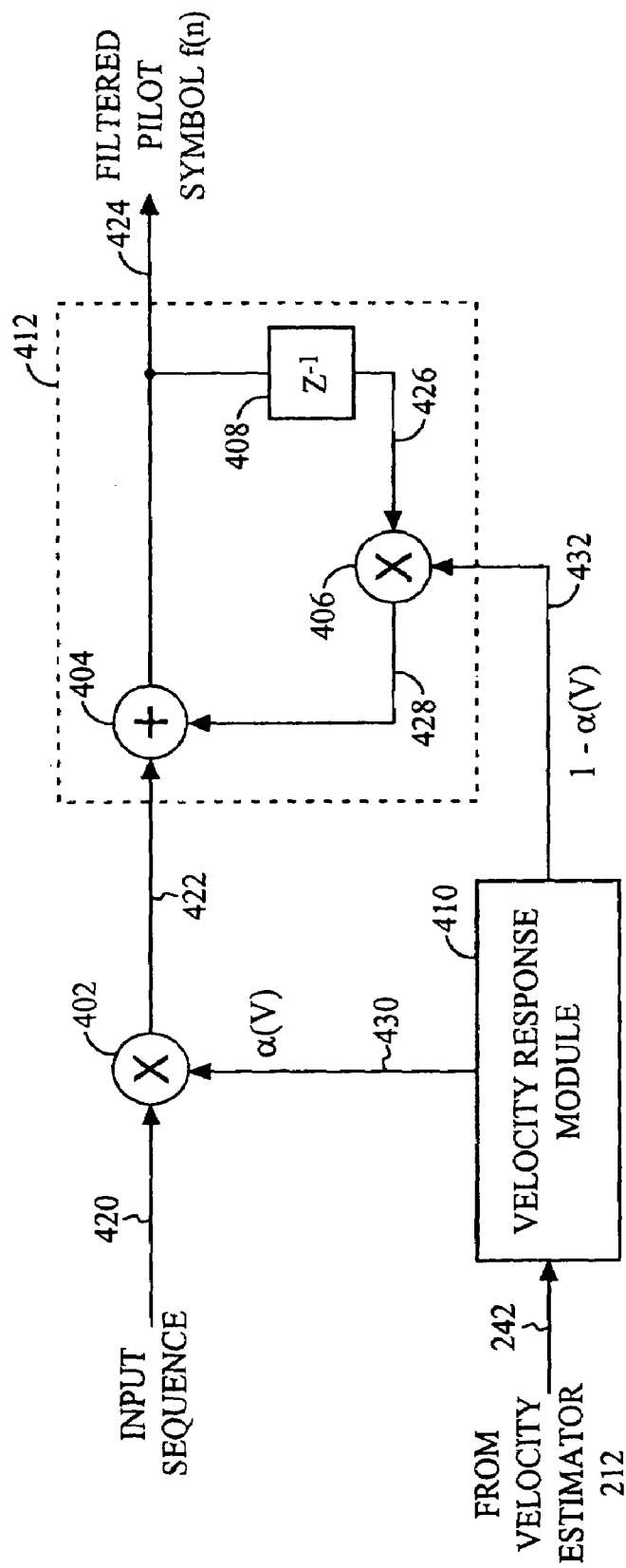
FIG. 4 is a block diagram illustrating an implementation of a filter path within a pilot filter.

FIG. 4 is a block diagram illustrating an implementation of a filter path within pilot filter 310. This implementation includes a multiplication node 402, a summation node 404, a multiplication node 406, a delay node 408, and a velocity response module 410. Summation node 404, delay node 408 and multiplication node 406 are part of a feedback loop 412. Together, these elements of implementation 400 operate as a low pass, first-order, infinite impulse response (IIR) filter having a single gain constant.

Multiplication node 402 receives an input sequence 420. Input sequence 420 is a sequence of pilot sequence set 338. Thus, in the implementation shown in FIG. 3, input sequence 420 is either in-phase sequence 340 or quadrature sequence 342. Input sequence 420 is sent to multiplication node 402, where it is multiplied with a first control signal 430. This multiplication results in the generation of an intermediate sequence 422. Intermediate sequence 422 is sent to summation node 404 within feedback loop 412. At summation node 404, intermediate sequence 402 is added with a feedback sequence 428. The generation of feedback sequence 428 is described below.

Summation node 404 produces an output sequence 424. Output sequence 424 is one of the sequences of filter pilot sequence set 344. Thus, in the implementation described above with reference to FIG. 3, output sequence 424 is either in-phase filtered pilot sequence 346 or quadrature filtered pilot sequence 348. As described above with reference to FIG. 3, output sequence 424 is sent to data demodulator 312.

In addition to being sent to data demodulator 312, output sequence 424 is sent to delay node 408. Delay node 408 incurs a delay of one discrete time step. By incurring this delay, delay node 408 generates a delayed sequence 426. Delayed sequence 426 is sent to multiplication node 406, where it is multiplied with a second control signal 432. This multiplication yields feedback sequence 428. As described above, feedback sequence 428 is added to intermediate sequence 422 at summation node 404.

Control signals 430 and 432 are adjusted by velocity response module 410 in response to velocity indications received from velocity estimator 212. As shown in FIG. 3, velocity response module 410 receives such velocity indications as velocity estimate signal 242. By varying the values of control signals 430 and 432, velocity response module 410 adjusts the bandwidth of pilot filter 310.

A predetermined relationship may exist between the values of control signals 430 and 432. For instance, by using α(v) to represent the value of control signal 430 as a function of velocity estimate signal 242 magnitude (expressed as v), the value of control signal 432 may be represented as 1−α(v).

Output sequence 424 is expressed below in Equation (2). In Equation (2), α(v) represents control signal 430, 1−α(v) represents control signal 432, y(n−1) represents delayed sequence 426, and x(n) represents input sequence 420.

$$y(n)=(1-\alpha(v))y(n-1)+\alpha(v)x(n) \qquad (2)$$

The bandwidth of pilot filter 310 is expressed below in Equation (3) as a function of control signals 430 and 432. In Equation (3), PSR represents the symbol rate of input sequence 420.

$$f_{3dB} = \frac{PSR}{2\pi}\cos^{-1}\left(1 - \frac{\alpha(v)^2}{2(1-\alpha(v))}\right) \qquad (3)$$

Equation (3) illustrates that the bandwidth of pilot filter 310 is dependent on the gain parameter, α(v). Specifically, as α(v) increases, the bandwidth of pilot filter 310 also increases. Thus, velocity response module 410 translates the velocity indicator, v, communicated by velocity estimate signal 242 into a gain, α(v) for the pilot filter.

Velocity response module 410 may perform this translation using a lookup table stored in memory. Alternatively, velocity response module 410 may employ an equation that defines a relationship between the magnitude of velocity estimate signal 242, v, and α(v).

Figure 5:
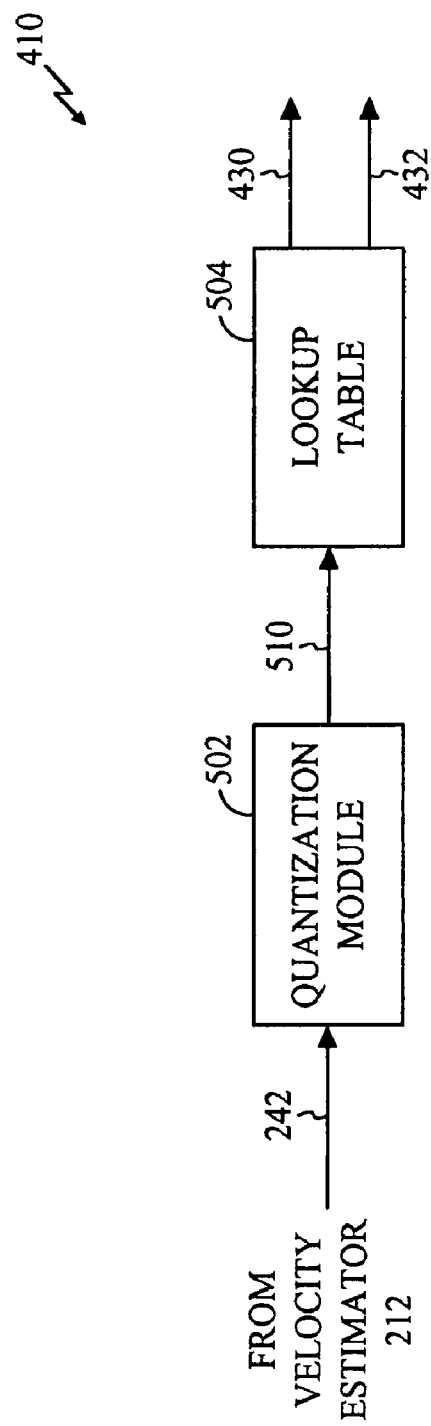
FIG. 5 illustrates a velocity response module that employs a lookup table.

FIG. 5 is an illustration of velocity response module 410 that employs a lookup table. Velocity response module 410 includes a quantization module 502, and a lookup table 504.

Quantization module 502 receives velocity estimate signal 242 and converts it into a velocity range code 510. Range code 510 may be one of a plurality of discrete values, where each value indicates a particular contiguous velocity range. Lookup table 504 receives range code 510 and outputs a corresponding parameter set that establishes the bandwidth of pilot filter 310, such as control signals 430 and 432.

Although Equations (2) and (3) provide for a certain quantitative relationship between control signals 430 and 432, other quantities may be used for the values of these control signals.

Other implementations of pilot filter 310 (not shown) may be employed, as would be apparent to persons skilled in the relevant arts. For example, pilot filter 310 may be implemented with a variety of suitable IIR low pass filters that employ various numbers of gain constants. In addition, a particular implementation of pilot filter 310 includes a plurality of filters. Such an implementation is shown in FIG. 6.

Figure 6:
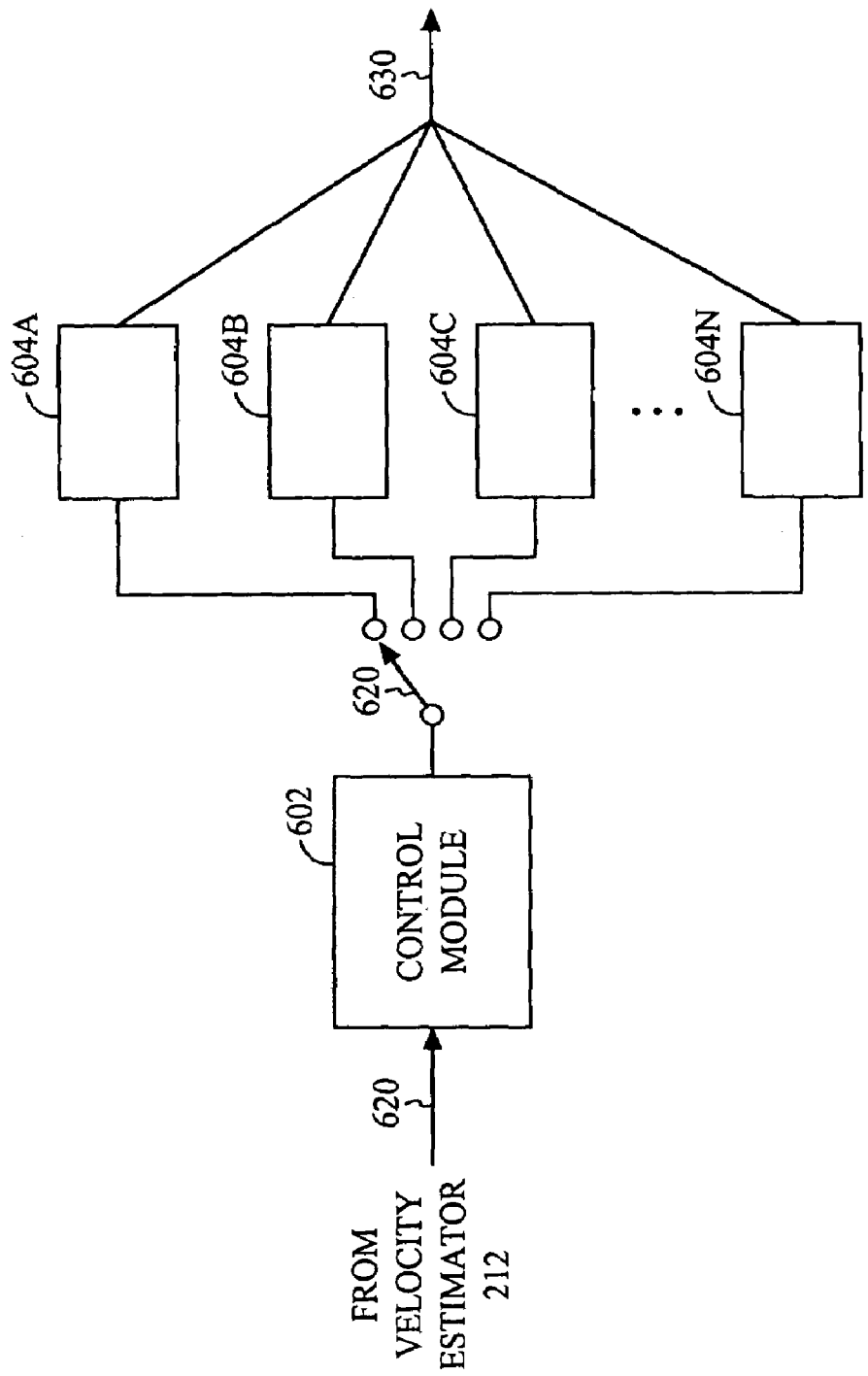
FIG. 6 is a block diagram that illustrates a further implementation of a filter path within a pilot filter.

FIG. 6 is a block diagram that illustrates an implementation of a filter path within pilot filter 310. A control module 602 is coupled to a plurality of filter components 604*a* through 604*n*. Each of filter components 604 has a distinct bandwidth that matches a corresponding velocity range.

Control module 602 receives an input sequence 620. Input sequence 620 is a sequence of pilot sequence set 338. Thus, for the demodulation finger 208 implementation shown in FIG. 3, input sequence 620 is either in-phase sequence 340 or quadrature sequence 342. Control module 602 selects one of filter components 604 and passes input sequence 620 to the selected filter.

Control module 602 bases this filter selection on the velocity of WCD 106. More particularly, control module 602 receives velocity estimate signal 242 from velocity estimator 212. This velocity estimate signal represents the velocity of WCD 106. From the magnitude of velocity estimate signal 242, control module 602 selects one of filter components 604 that has a velocity range that encompasses the represented velocity.

Figure 7:
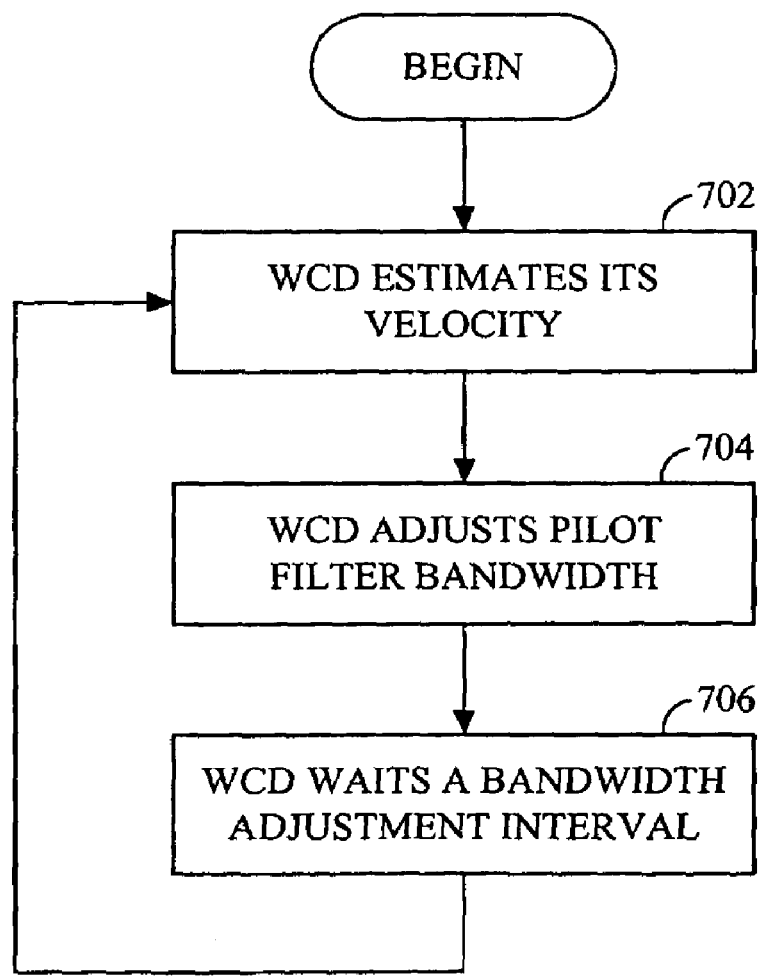
FIG. 7 is a flowchart illustrating an operational sequence involving improved pilot signal reception.

FIG. 7 is a flowchart illustrating an operational sequence involving improved pilot signal reception. This operational sequence begins with a step 702. In step 702, WCD 106 estimates its velocity. This step is performed by velocity estimator 212. Next, in a step 704, WCD 106 adjusts the bandwidth of pilot filter 310 in response to the velocity estimated in step 702. This adjustment mitigates the introduction of noise and distortion to pilot signals received by WCD 106.

Step 702 comprises the steps of increasing the bandwidth of pilot filter 310 as the estimated velocity increases, and decreasing the bandwidth of pilot filter 310 as the estimated velocity decreases.

Steps 702 and 704 may be performed at periodically occurring time increments. Thus, in a step 706, WCD 106 waits a bandwidth adjustment interval before returning operation to step 702.

Figure 8:
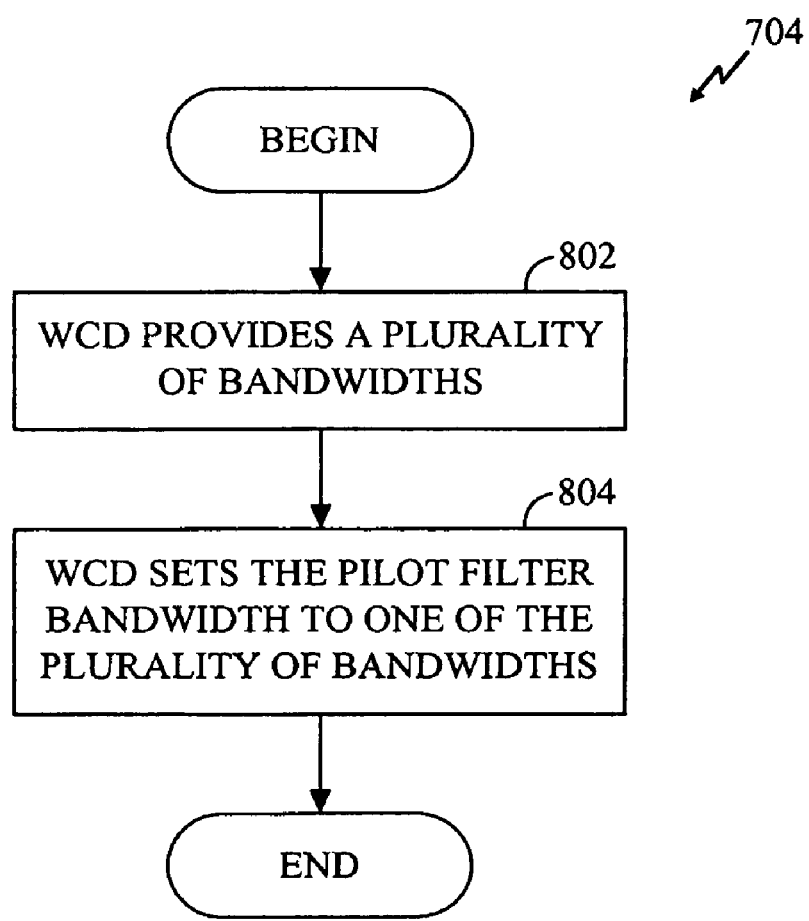
FIG. 8 is a flowchart illustrating an operational sequence involving bandwidth adjustment.

FIG. 8 is a flowchart illustrating a performance of step 704 in greater detail. This performance begins with a step 802, where WCD 106 provides a plurality of bandwidths. Each of these plurality of bandwidths corresponds to a particular velocity range. For example, with reference to FIG. 5, lookup table 504 contains a plurality of parameter sets (i.e., values for control signals 430 and 432) that provide for a corresponding plurality of pilot filter 310 bandwidths, where each of these bandwidths corresponds to a particular velocity range.

In a step 804, WCD 106 sets the bandwidth of pilot filter 310 to one of the plurality of bandwidths. Referring again to FIG. 5, range code 510, which encodes a velocity range of WCD 106, causes one of the plurality of parameter sets stored in lookup table 504 to be utilized by pilot filter 310. As described above with reference FIG. 5, the particular parameter set utilized determines the bandwidth of pilot filter 310.

FIG. 6 provides a further example of steps 802 and 804. Each of filter components 604 provides a bandwidth that matches a corresponding velocity range. Furthermore, control module 602 sets the bandwidth of pilot filter 310 by selecting one of filter components 604 based on the velocity of WCD 106 and passing a pilot sequence to the selected filter.

IV. Velocity Estimator

As described above with reference to FIGS. 2 and 3, velocity estimator 212 receives control signal 240 from AGC module 206 and baseband pilot sequence set 338 from one of demodulation fingers 208. From these inputs, velocity estimator 212 generates velocity estimate signal 242, which is sent to each of demodulation fingers 208 to control the bandwidth of its corresponding pilot filter 310. Velocity estimate signal 242 is used by each of these fingers.

Velocity estimator 212 utilizes fading characteristics of multipath transmissions to estimate the velocity of WCD 106. As described above, the physical terrain and structure surrounding WCD 106 create multiple signal paths from the base station 102 to WCD 106. Each multipath component can be modeled as a composite signal having a slow fade component and a fast fade component.

Figure 9:
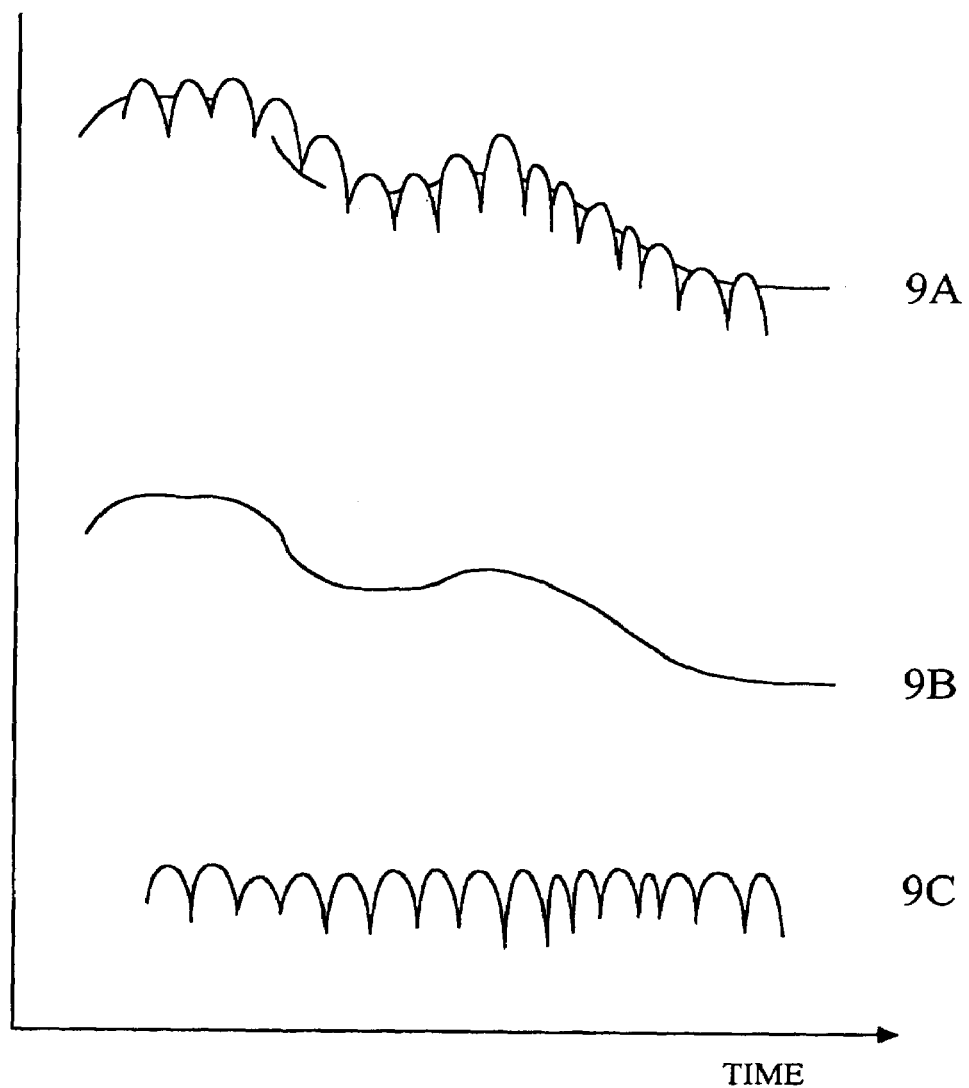
FIGS. 9A–9C are graphs illustrating multipath fading characteristics.

FIG. 9A provides an example of such a composite signal received by WCD 106. This signal exhibits a variation in time of the received signal power due to slow fade and fast fade components, is shown in FIG. 9A. The corresponding slow fade component of the composite received signal is shown in FIG. 9B. The corresponding fast fade, or Rayleigh fade, component of the composite received signal is shown in FIG. 9C. AGC module 206 is able to compensate for nearly all of the effects of such slow fading. Additionally, AGC module 206 is able to compensate for a portion of the effects of such Rayleigh fading.

Velocity estimator 212 performs measurements of the power in a single multipath component over time to estimate the velocity of WCD 106. These estimates are based on the number of times the power of this multipath component crosses one half of its RMS power level in a given period of time. This quantity is referred to herein as the level crossing rate.

More particularly, velocity estimator 212 bases the value of velocity estimate signal 242 upon the number of times the fast fade portion of a multipath signal component crosses the one half RMS power level threshold over a given period of time. This threshold is not the only threshold that can be used for velocity estimation. Any other fraction or multiple of the RMS power level may be chosen as the threshold level. However, using one half of the RMS power level as a threshold results in a maximum level crossing rate for a given velocity.

Since velocity estimator 212 estimates the power of a single multipath component, it processes a baseband pilot sequence set 338 from one of demodulation fingers 208, which represents an isolated multipath pilot signal.

Since AGC module 206 maintains signal set 220 at a substantially constant power level, it essentially eliminates information that is needed for velocity estimator 212 to estimate the power of a multipath component, as received through antenna segment 202. Therefore, to measure the power of an isolated multipath component, the gain adjustments performed by AGC module 206 must be removed.

Figure 10:
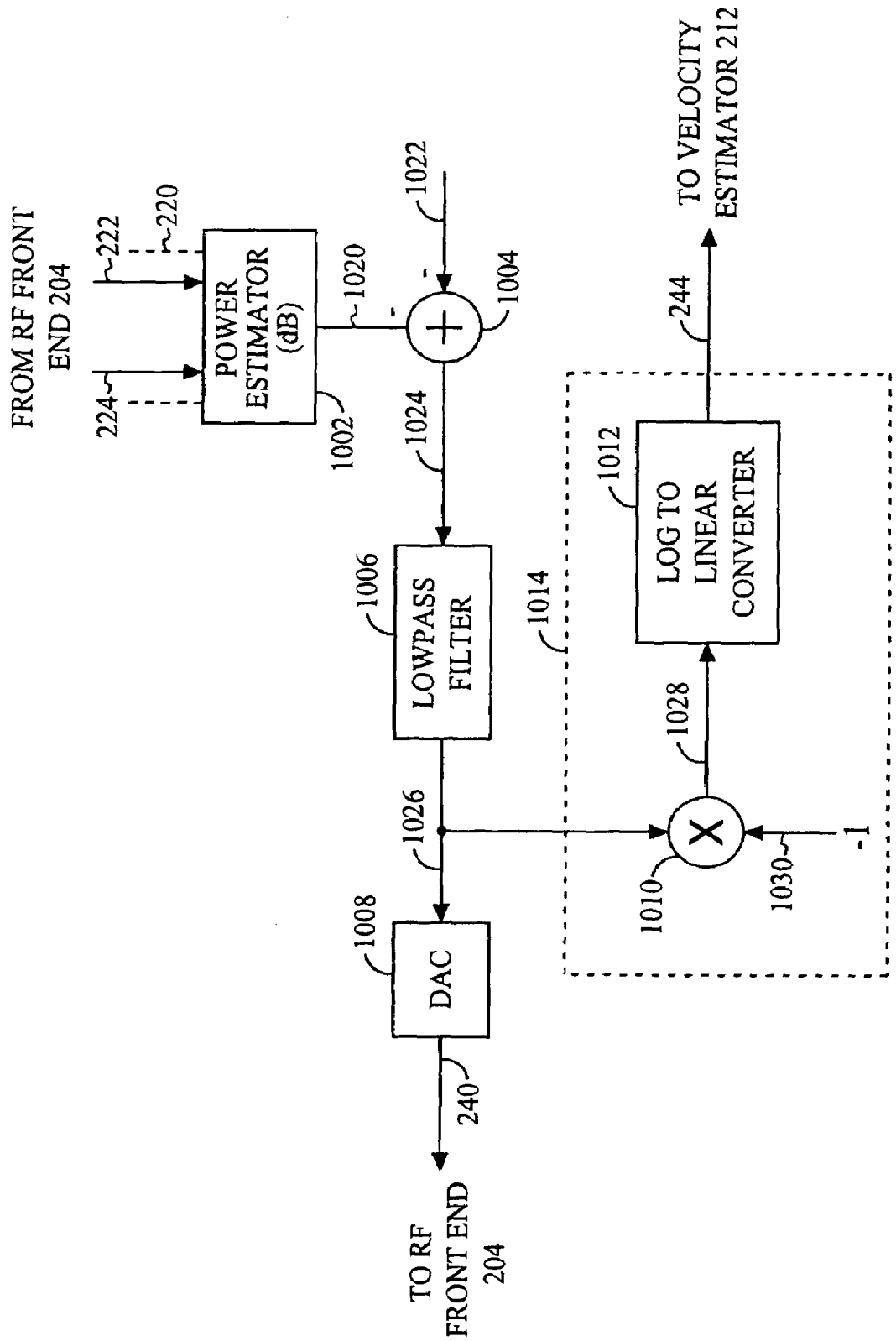
FIG. 10 is a block diagram illustrating an implementation of an automatic gain control module.

The gain adjustment effects of AGC module 206 are removed by a scaling feature that adjusts amplified signals by the inverse of the gain controlled by AGC module 206. FIG. 10 is a block diagram illustrating an implementation of AGC module 206 that provides such a scaling feature.

FIG. 10 shows a power estimator 1002, a summation node 1004, a lowpass filter 1006, a digital to analog converter (DAC) 1008, an inverting node 1010, and a log to linear converter 1012. Together, inverting node 1010, and log to linear converter 1012 are included in a scaling module 1014.

Power estimator 1002 receives baseband signal set 220 (i.e., signal components 222 and 224) and estimates its instantaneous power. Power estimator 1002 outputs a power estimate signal 1020 that is sent to summation node 1004. At summation node 1004, power estimate signal 1020 is subtracted from a predetermined set point 1022. Predetermined set point 1022 is chosen to represent a power value near the upper bound of analog to digital converter(s) (ADCs) within RF front end 204 that are employed to produce baseband signal set 220. When power estimate signal 1020 exceeds set point 1022, summation node 1004 produces an adjustment signal 1024 that reduces the gain of amplification component(s) within RF front end 204. However, when power estimate signal 1020 exceeds set point 1022, adjustment signal 1024 increases the gain of such amplification component(s).

Adjustment signal 1024 is sent to low pass filter 1006, which produces a digital control signal 1026. Digital control signal 1026 is sent to (DAC) 1008 to generate gain control signal 240, which is sent to RF front end 204. DAC 1008 may be removed for implementations of RF front end 204 that receive digital gain control signals 240. As described above, amplification component(s) within RF front end 204 vary their gain according to the value of gain control signal 240.

Digital control signal 1026 is also sent to scaling component 1014, where it is input to inverting node 1010. Inverting node 1010 is shown as a multiplier having a multiplication factor of −1. However, other suitable implementations may be employed. Inverting node 1010 generates an inverted control signal 1028, which is sent to log to linear converter 1012. Log to linear converter 1024 operates according to a transfer function. This transfer function is the inverse of the function that defines the relationship between gain control signal 240 values and amplification gain of RF front end 204. As a result of this transfer function, log to linear converter 1024 produces voltage estimate 244, which is an estimate of the component signal=s voltage, as received through antenna segment 202.

Scaling module 1014 provides sufficient signal processing to allow an accurate determination of the level crossing rate when the SNR of a received signal is high. This is because noise components in the received signal are insignificant in relation to the received signal power and thus, do not adversely contribute to the determination of the level crossing rate. However, when noise components represent a significant contribution to the total power of a received signal, the noise components adversely contribute to the determination of the level crossing rate when a single threshold is used.

The frequency of a composite signal's fast fading component can be estimated using the expected velocity range that the receiver will experience. The pilot integration time must be sufficiently less than the period of the fast fade in order to reliably detect level crossings. Because this amount of time is finite when the channel exhibits fading, measured pilot power has a certain amount of noise associated with it. This amount of noise may be represented as an SNR measurement.

The SNR of an integrated pilot signal=s power is directly proportional to a quantity expressed below in Equation (4).

$$Iorhat_0 * (Ecp/Ior)/(Ioc+Nt) \qquad (4)$$

In Equation (4), $Iorhat_0$ represents the amount of signal power received at WCD 106 in a path 0, (Ecp/Ior) represents the ratio of pilot signal energy to the total energy transmitted at base station 102, and (Ioc+Nt) represents the total interference due to adjacent base stations and thermal noise.

Therefore, as indicated by Equation (4), when the total receive power of a pilot signal is low or when its associated levels of interference and noise are high, the measurement of a pilot signal=s power is noisy. This noise causes the estimate of the pilot signal=s power to traverse a level crossing threshold value many times. In contrast, when a pilot signal is received in a noise free system, its power traverses a level crossing threshold value only once.

In order to decrease the effect of a pilot signal=s SNR on its level crossing rate, velocity estimator 212 employs level crossing hysteresis. This hysteresis feature employs a high threshold and a low threshold. According to this feature, a signal's amplitude is not considered to cross the employed threshold level unless it starts below the lower hysteresis threshold (set N dB lower than the employed threshold level) and then crosses the upper hysteresis threshold (set M dB higher than the employed threshold level), or vice versa.

For a particular signal, the threshold level that results in a maximum number of level crossings is one half of the signal=s RMS signal power. However, any level relative to the RMS power level may be used. In an exemplary implementation, M and N are each set to 3 dB. However, these values may differ.

Therefore, the hysteresis feature employed by velocity estimator 212 prevents small changes in the measurement of a signal's amplitude that are less than (N+M) dB from getting considered in level crossing rate computations. The level hysteresis algorithm employed by velocity estimator 212 can be expressed by the following pseudocode. In this pseudocode, s(n) represents the symbol amplitude at a time n, $T_H$ represents a high hysteresis threshold level, and $T_L$ represents a low hysteresis threshold level.

```
if (s(n) < T_L) {
    if (thresholdFlag = = 0) {
        levelCrossingCounter++;
    }
    thresholdFlag = 1;
}
else if (s(n) > T_H) {
    if (thresholdFlag = = 1)
        levelCrossingCounter++;
    }
    thresholdFlag = 0;
}
```

Figure 11:
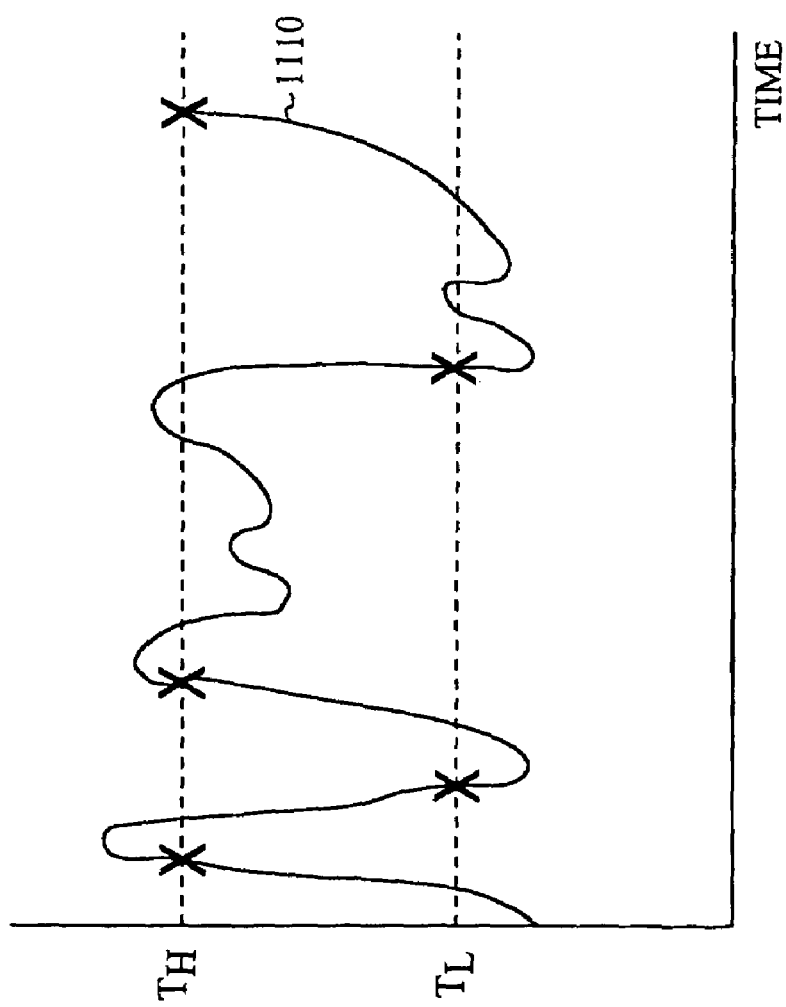
FIG. 11 is a graph showing an estimate of a signal in a noisy environment.

FIG. 11 is a graph showing an application of the level hysteresis algorithm to a multipath 1110 over time in a noisy environment. Ordinarily, fast fading produces signals, such as the one shown in FIG. 9C. However, contributions from noise component result in a noisy estimate of the multipath signal. This high hysteresis threshold is denoted as $T_H$ and the lower hysteresis threshold is denoted as $T_L$. The predetermined threshold level to determine level crossings (not shown) is at a power level that is between hysteresis thresholds and $T_H$ and $T_L$. When the hysteresis algorithm is applied to this noisy signal estimate, level crossings are considered to occur only at points denoted in FIG. 11 by "X".

Figure 12:
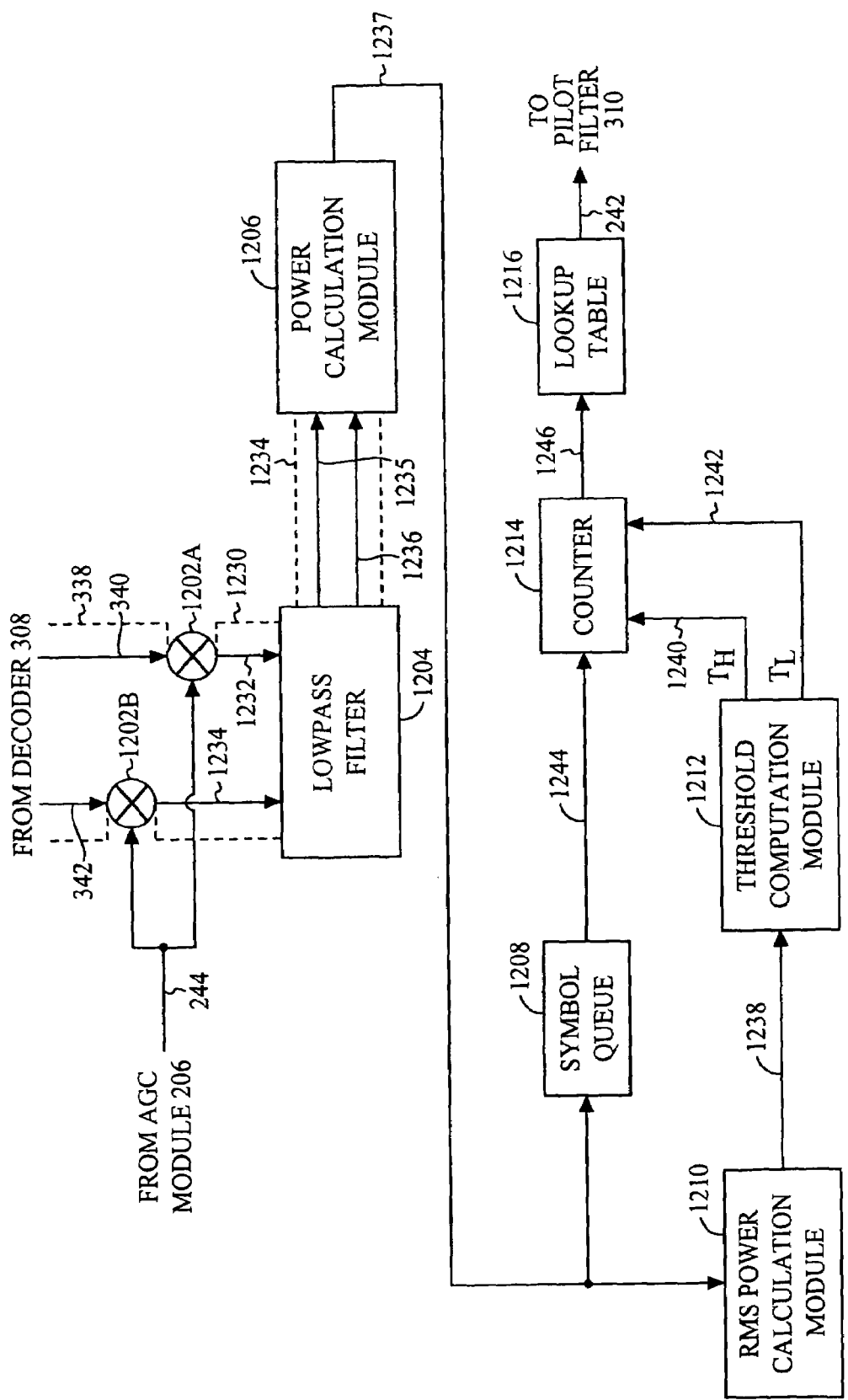
FIGS. 12 and 13 are block diagrams showing velocity estimator implementations.

FIG. 12 is a block diagram illustrating a first implementation of velocity estimator 212, which employs the hysteresis algorithm described above. This implementation includes multiplication nodes 1202a and 1202b, a lowpass filter 1204, a power calculation module 1206, a symbol queue 1208, an RMS power calculation module 1210, a threshold computation module 1212, a counter 1214, and a lookup table 1216.

A voltage estimate 244 is received from AGC module 206 at multiplication nodes 1202a and 1202b. At these nodes, voltage estimate 244 is multiplied with a corresponding sequence within baseband pilot sequence set 338.

Multiplication nodes 1202a and 1202b produce a sequence set 1230 that represents baseband sequence set 338 with the power stabilization effects of AGC module 206 removed. Sequence set 1230 includes an in-phase sequence 1232 and a quatrature sequence 1234.

Sequence set 1230 is sent to low pass filter 1204, which produces a filtered sequence set 1234 including in-phase sequence 1235 and quadrature sequence 1236. Power calculation module 1206 receives filtered sequence set 1234 and calculates its instantaneous power.

To calculate instantaneous power, power calculation module 1206 computes the sum of the squares of each sequence within filtered sequence set 1234 and calculates the square root of this sum. Power calculation module 1206 outputs this instantaneous power as energy sequence 1237. Power signal 1237 is sent to queue 1208 and RMS power calculation module 1210.

RMS power calculation module 1210 calculates a RMS power sequence 1238 using a predetermined number of consecutive values of energy sequence 1237. RMS power sequence value is sent to threshold computation module 1212. Threshold computation module 1212 uses the predetermined hysteresis values (M and N) as described above to calculate upper and lower level crossing thresholds 1240 and 1242. These thresholds are coupled to a level crossing counter 1214.

Queue 1208 is a first in first out (FIFO) buffer. Queue 1208 has a depth that corresponds to the number of symbols used in the running calculations performed by RMS power calculation module 1210. Thus, symbol queue 1208 delays energy sequence 1237 and sends a delayed energy sequence 1244 to counter 1214.

Counter 1214 counts the number of level crossings of energy sequence 1244 using thresholds 1240 and 1242 to provide hysteresis in the counting. In performing such counting, counter 1214 outputs a count 1246, which is sent to lookup table 1216.

Lookup table 1216 maps the number of level crossings (as indicated by count 1246) that occur in a given period of time to an estimated velocity. The velocity estimate is output as velocity estimate 246. Alternatively, velocity estimator 212 may be implemented without lookup table 1216. In such implementations, count 1246 is used directly as a velocity estimate.

Figure 13:
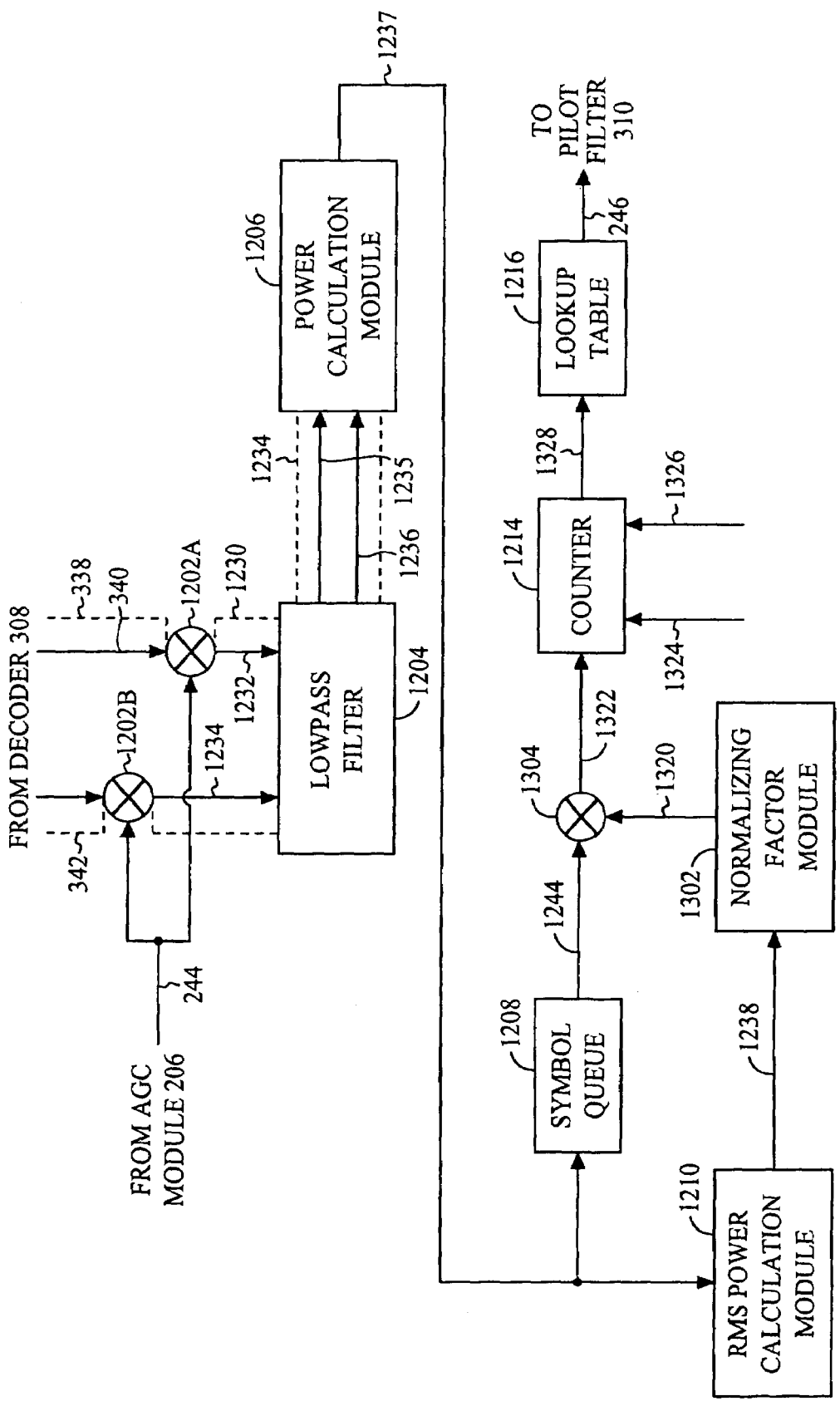

A second implementation of velocity estimator 212 is shown in FIG. 13. This implementation is similar to the implementation shown in FIG. 12. In fact, both implementations are the same from the reception of voltage estimate 244 to the generation of energy sequence 1237. However, the second implementation calculates level crossings in a different manner.

In the second implementation, energy sequence 1237 is sent to queue 1208 and RMS power calculation module 1210, as in the first implementation. However, in the second implementation, RMS power calculation module 1210 sends RMS power sequence 1238 to a normalizing factor module 1302. Normalizing factor module 1302 calculates and outputs 2/x, where x represents RMS power sequence 1238 and 2/x is a normalizing factor 1320.

Normalizing factor 1320 is sent a multiplication node 1304, which also receives delayed energy sequence 1244 from queue 1208. Multiplication node 1304 multiplies these inputs and generates a normalized sequence 1322. Normalized sequence 1322 represents delayed energy sequence 1244 normalized by one-half of RMS power sequence 1238.

Normalized sequence 1322 is sent to counter 1214, which counts the number of level crossings of sequence 1322. However, unlike the implementation of FIG. 12, where counter 1214 receives varying hysteresis thresholds, in the implementation of FIG. 13, counter 1214 receives hysteresis thresholds that remain constant. These constant thresholds are shown in FIG. 13 as high threshold 1324 and low threshold 1326. This implementation may employ constant hysteresis values because sequence 1322 is normalized by a value proportional to RMS power sequence 1238.

Counter 1214 outputs a count 1328, which is sent to lookup table 1216 to determine velocity estimate 246. In the second implementation, as in the first implementation, lookup table 1216 is optional. Thus, count 1328 may be used directly, or velocity estimate 246 may be calculated from it.

V. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For instance, the above description involves signal and symbol sets having in-phase and quadrature components. These sets are associated with QPSK modulation. However, the present invention may employ other types of signal sets that are associated with other modulation techniques. These sets may include any number of components. For example, such sets may be associated with binary phase shift keying (BPSK) and include only a single component.

In addition, although the implementations of velocity estimator 212 described above perform velocity estimation using level crossing measurements, velocity estimator 212 may perform such estimation through the periodic monitoring of the device's location through services, such as the global positioning system (GPS).

Furthermore, the techniques of the present invention may be employed in other communications environments that do not involve IS-95 or CDMA.

What is claimed is:

1. A method of improving the reception of a signal in a wireless communications device (WCD), comprising the steps of:
    (a) estimating the velocity of the WCD based on a level crossing rate, determined based on complete traversal of a hysteresis range bounded by an upper threshold and a lower threshold; and
    (b) adjusting a filter bandwidth in the WCD in response to the estimated velocity, to mitigate the introduction of noise and distortion to the signal.

2. The method of claim 1, wherein step b) comprises the steps of:
    (1) increasing the filter bandwidth as the estimated velocity increases; and
    (2) decreasing the filter bandwidth as the estimated velocity decreases.

3. The method of claim 1, wherein steps a) and b) are performed at periodically-occurring time increments.

4. The method of claim 1, wherein the signal is a pilot signal.

5. The method of claim 1, wherein step (b) comprises the steps of:
    (1) providing a plurality of predetermined bandwidths, wherein each predetermined bandwidth corresponds to a particular velocity range; and
    (2) setting the filter bandwidth to one of the plurality of predetermined bandwidths that corresponds to the estimated velocity.

6. The method of claim 5, wherein step (1) includes the step of providing a plurality of filter components, wherein each filter component has a corresponding bandwidth.

7. The method of claim 5, wherein step (1) includes the step of providing a lookup table that translates a velocity estimate into one or more filter parameters, wherein the one or mare filter parameters determine the fiber bandwidth.

8. The method of claim 1, wherein a level crossing is determined each time a signal power begins outside of the hysteresis range and completely inverses the hysteresis range.

9. A system for improving the reception of a signal in a wireless communications device (WCD), comprising:
    a velocity estimator that generates a velocity estimate based on a level crossing rate determined based on complete traversal of a hysteresis range bounded by an upper threshold and a lower threshold; and
    a filter having a bandwidth that is adjusted in response to velocity estimate, to mitigate the introduction of noise and distortion to the signal.

10. The system of claim 9, wherein said filter is adapted to increase the filter bandwidth as the estimated velocity increases, and decrease the filter bandwidth as the estimated velocity decreases.

11. The system of claim 9, wherein the signal is a pilot signal.

12. The system of claim 9, wherein said filter comprises:
    a plurality of predetermined bandwidths, wherein each predetermined bandwidth corresponds to a particular velocity range; and
    means for setting the filter bandwidth to one of the plurality of predetermined bandwidths that corresponds to the estimated velocity.

13. The method of claim 9, wherein a level crossing is determined each time a signal power begins outside of the hysteresis range and completely traverses the hysteresis range.

* * * * *